United States Patent
Khosla et al.

(10) Patent No.: US 9,671,493 B1
(45) Date of Patent: Jun. 6, 2017

(54) AUTOMATED SCHEDULING OF RADAR-CUED CAMERA SYSTEM FOR OPTIMIZING VISUAL INSPECTION (DETECTION) OF RADAR TARGETS

(71) Applicant: HRL Laboratories, LLC, Malibu, CA (US)

(72) Inventors: Deepak Khosla, Camarillo, CA (US); David J. Huber, Calabasas, CA (US); Yang Chen, Westlake Village, CA (US)

(73) Assignee: HRL Laboratories, LLC, Malibu, CA (US)

( * ) Notice: Subject to any disclaimer, the term of this patent is extended or adjusted under 35 U.S.C. 154(b) by 449 days.

(21) Appl. No.: 14/491,877

(22) Filed: Sep. 19, 2014

(51) Int. Cl.
*G01S 13/86* (2006.01)
*H04N 5/232* (2006.01)

(52) U.S. Cl.
CPC ....... *G01S 13/867* (2013.01); *H04N 5/23296* (2013.01)

(58) Field of Classification Search
CPC .......................... G01S 13/867; H04N 5/23296
USPC ................... 342/52, 54, 55, 95–97
See application file for complete search history.

(56) References Cited

U.S. PATENT DOCUMENTS

| | | | |
|---|---|---|---|
| 6,967,612 B1 * | 11/2005 | Gorman | G01S 7/024 342/175 |
| 8,049,658 B1 * | 11/2011 | Lagonik | G01C 21/005 342/118 |
| 2004/0125210 A1 * | 7/2004 | Chen | G01S 3/7864 348/207.99 |
| 2009/0096664 A1 * | 4/2009 | Carroll | G01S 7/4026 342/147 |
| 2013/0093615 A1 * | 4/2013 | Jeon | G08B 13/19695 342/118 |

(Continued)

FOREIGN PATENT DOCUMENTS

| | | | | |
|---|---|---|---|---|
| EP | 1760491 A2 * | 3/2007 | | G01S 7/4026 |
| JP | WO 2012101967 A1 * | 8/2012 | | G01S 13/867 |

OTHER PUBLICATIONS

A. S. Barry and D. S. Mazel, "The Secure Perimeter Awareness Network (SPAN) at John F. Kennedy International Airport," 2007 41st Annual IEEE International Carnahan Conference on Security Technology, Ottawa, Ont., 2007, pp. 183-188.*

(Continued)

*Primary Examiner* — John B Sotomayor
(74) *Attorney, Agent, or Firm* — Tope-McKay & Associates

(57) ABSTRACT

Described is system for optimizing visual inspection of radar targets. The system detects radar hits with a radar system comprising radar and a radar-cued camera. The camera has a current state comprising a current slew position and a current zoom level. The radar hits are stored, and a set of metrics are determined for each radar hit. A track value (TV) metric is determined that combines the set of metrics for each zoom level of the camera. The camera sends a set of commands based on the TV metric, such that the camera slews from the current state to a new state. The new state is a position of a radar hit with the largest TV metric and a corresponding zoom level. Given the new state, an image is captured and processed to generate captured tracks. The current state of the camera is updated to reflect the new state.

19 Claims, 8 Drawing Sheets

(56) References Cited

U.S. PATENT DOCUMENTS

2016/0125713 A1* 5/2016 Blech .................. G08B 13/187
                                                      348/143

OTHER PUBLICATIONS

Van den Broek, B., et al., 2009, "Automatic detection of Hostile Behavior," Proc. SPIE vol. 7480, 74800R-1.
Schwering, P.B.W., et al., 2009, "Application of heterogeneous Multiple Camera System with Panoramic Capabilities in a Harbor Environment," Proc. SPIE vol. 7481, 74810C-1.
Surveillance camera scheduling: a virtual vision approach, Faisal Z. Qureshi, Demetri Terzopoulos, Multimedia Systems, 2006, 12:269-283.
Collaborative Real-Time Control of Active Cameras in Large Scale Surveillance Systems, Nils Krahnstoever, Ting Vu, et al., M2SFA2 2008: Workshop on Muiti-camera and Multi-modal Sensor Fusion.
MTEQ is the sole fabricator of the government-designed Cerberus Lite Scout | Cerberus Lite G-Boss | APSS (2010), http://www.mteq.com/cgi-bin/dynamic.
py?Page=manufacturingServicesCerberusLite.
Blighter Explorer (2014), http://www.blighter.com/products/blighter-explorer.html.
Radar Video Surveillance (RVS) Brochure—Automated Detection, Tracking, and Video Response to Security Threats (2006), http://www.honeywellintegrated.com/products/integrated-security/video/97630.html.
Radar Video Surveillance (RVS) Overview (Feb. 26, 2007), http://www.honeywellintegrated.com/products/integrated-security/video/97630.html.
'Kraken' provides needed intelligence, force protection at NIE (Aug. 31, 2011) http://www.army.mil/article/64655/.

* cited by examiner

AUTOMATED SCHEDULING OF RADAR-CUED CAMERA SYSTEM FOR OPTIMIZING VISUAL INSPECTION (DETECTION) OF RADAR TARGETS

GOVERNMENT LICENSE RIGHTS

This invention was made with government support under U.S. Government Contract Number Contract # W31 P4Q-08-C-0264 awarded by DARPA. The government has certain rights in the invention.

FIELD OF INVENTION

The present invention relates to a system for optimizing visual inspection of radar targets and, more particularly, to a system for optimizing visual inspection of radar targets though automated scheduling of a radar-cued camera system.

BACKGROUND OF THE INVENTION

A wide field-of-view and rapid response to threats are critical components of any surveillance system. A wide field-of-view is normally implemented by articulating a camera: allowing it to swivel to pan and tilt, and actively zooming in on "interesting" locations. Since a single camera suffers from the "soda straw" problem, where only a small portion of the scene can be examined at any given time leaving the rest of the scene unwatched, surveillance systems often employ a radar unit to direct the operator to likely targets. This provides direction to the search but still poses a security risk, since potentially hazardous activities might be occurring in an unwatched portion of the field-of-view while the operator is investigating another incident (either coincidental or intentionally distracting).

There are a number of security systems that combine camera and radar that are designed for ground-level surveillance. Among them are (1) the Night Vision Labs Cerberus Scout manufactured by MTEQ located at 140 Technology Park Drive, Kilmarnock, Va.; (2) the Blighter Explorer manufactured by Blighter Surveillance Systems located at The Plextek Building, London Road, Great Chesterford, Essex, CB10 1NY, United Kingdom; (3) the Honeywell Radar Video Surveillance (RVS) system manufactured by Honeywell, which is located at 2700 Blankenbaker Pkwy, Suite 150, Louisville, Ky. 40299; and (4) the U.S. Army's COSFPS (a.k.a. the "Kraken"). While these systems are manufactured by different corporations and employ different combinations of sensors and "size, weight, and power" (SWAP) constraints for deployment, they all share a common theme; each system contains a radar that scans for targets, a camera or cameras (e.g., electro-optical (EO) and infrared (IR)) that can mechanically slew and zoom to regions of interest (most likely as the result of a radar message), and an operator console that allows a human operator to either automatically slew to radar hits or examine other locations by manually controlling the camera. Existing systems will suffer from the same limitations: they are manual and the combined radar-camera system only allows visually examine a subset of the radar hits. Adding more cameras may improve the ability to visually detect more targets, but the system complexity and cost will go up.

There is published prior art to automate the radar-camera system for object detection and recognition. For example, van den Broek et al. (see the List of Incorporated Cited Literature References, Literature Reference No. 1) proposes a system that employs simultaneous use of a visual sensor (camera) and radar to perform surveillance operations and automatic target recognition (ATR). The van den Broek system focuses on behavior recognition using a combination of radar and wide field-of-view video cameras. Additionally, their system uses a radar unit to determine the azimuth and distance of a target, and then employs a video camera to capture target video for analysis by the ATR system. However, the van den Broek system does not try to optimize the camera slew/zoom to maximize the number of radar hits that can be visually examined by an operator (or even ATR for that matter).

Additionally, Schwering et al. (see Literature Reference No. 2) employs a panoramic array of heterogeneous cameras (as opposed to a single camera), radar, and an "automated identification system" (AIS) consisting of tracking and classification mechanisms. The panoramic camera array is reactive to radar messages, meaning that the camera is idle until a radar message is received, and then slews to the target location after the radar hit has been received. Such a reactive process can lead to missing targets that move very quickly, or missing targets when multiple radar hits are received simultaneously, making it impossible for a human operator to slew the camera and identify all of the targets prior to their movement away from their original locations.

Other bodies of work (see Literature Reference Nos. 3 and 4) deal with scheduling multiple pan-tilt-zoom (PTZ) cameras for detection and tracking, which is fundamentally very different due to multiple cameras. The emphasis is on tracking (as opposed to detection) and only one object can be tracked by one PTZ camera at a time.

Thus, a continuing need exists for a system that can detect multiple objects at once with a single camera which also optimizes camera slew and zoom to maximize the number of radar hits that can be visually examined by an operator.

SUMMARY OF THE INVENTION

The present invention relates to a system for optimizing visual inspection of radar targets and, more particularly, to a system for optimizing visual inspection of radar targets though automated scheduling of a radar-cued camera system. The system comprises one or more processors and a memory having instructions such that when the instructions are executed, the one or more processors perform multiple operations. The system detects a plurality of radar hits with a radar system, wherein the radar system comprises a radar and a radar-cued camera having a current state comprising a current slew position and a current zoom level. The plurality of radar hits is stored as a stored track list. A plurality of metrics id determined for each radar hit, wherein the plurality of metrics comprises a track life value (TLV) metric, a slew value (SV) metric, and a coverage value (CV) metric. For each radar hit, a track value (TV) metric is determined that combines the plurality of metrics for each zoom level of the radar-cued camera. The radar-cued camera sends a set of pan-tilt-zoom commands based on the TV metric, such that the radar-cued camera slews from the current state to a new state. The new state is a position of a radar hit with the largest TV metric and a corresponding zoom level. An image given the new state is captured and processed to generate a set of captured tracks, and the current state of the radar-cued camera is updated to reflect the new state.

In another aspect, the system updates the stored track list to delete radar hits corresponding to the captured tracks from the stored track list.

In another aspect, the TLV metric for each radar hit corresponds to time that has elapsed since the radar hit was first detected, such that a newer radar hit has a higher TLV metric and an older radar hit has a lower TLV metric.

In another aspect, the system determines the SV metric for each radar hit according to the following:

$$SV=\max\{0,1-S/M\},$$

where S denotes a slew angle needed from a current position of the radar-cued camera to a position of the radar hit, max denotes a maximization function, and M denotes a predetermined maximum slew angle.

In another aspect, the CV metric is proportional to a number of radar hits that fall within a field-of-view of the radar-cued camera, and the system determines the CV metric according to the following:

$$CV(z)=\max\{0,1-N/CM\},$$

where CM denotes a maximum number of radar hits expected within the field-of-view of the radar-cued camera, z denotes the zoom level, max denotes a maximization function, and N denotes an actual number of radar hits within the field-of-view of the radar-cued camera at a given slew position and zoom level z.

In another aspect, the system determines the TV metric according to the following:

$$TV(z)=W_T \times TLV + W_S \times SV + W_C \times CV(z),$$

such that $\Sigma(W_T+W_S+W_C)=1$,
where $W_T$ denotes weighting of the TLV metric, $W_S$ denotes weighting of the SV metric, $W_C$ denotes weighting of the CV metric, and $\Sigma$ denotes a summation.

In another aspect, the present invention also comprises a method for causing a processor to perform the operations described herein.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
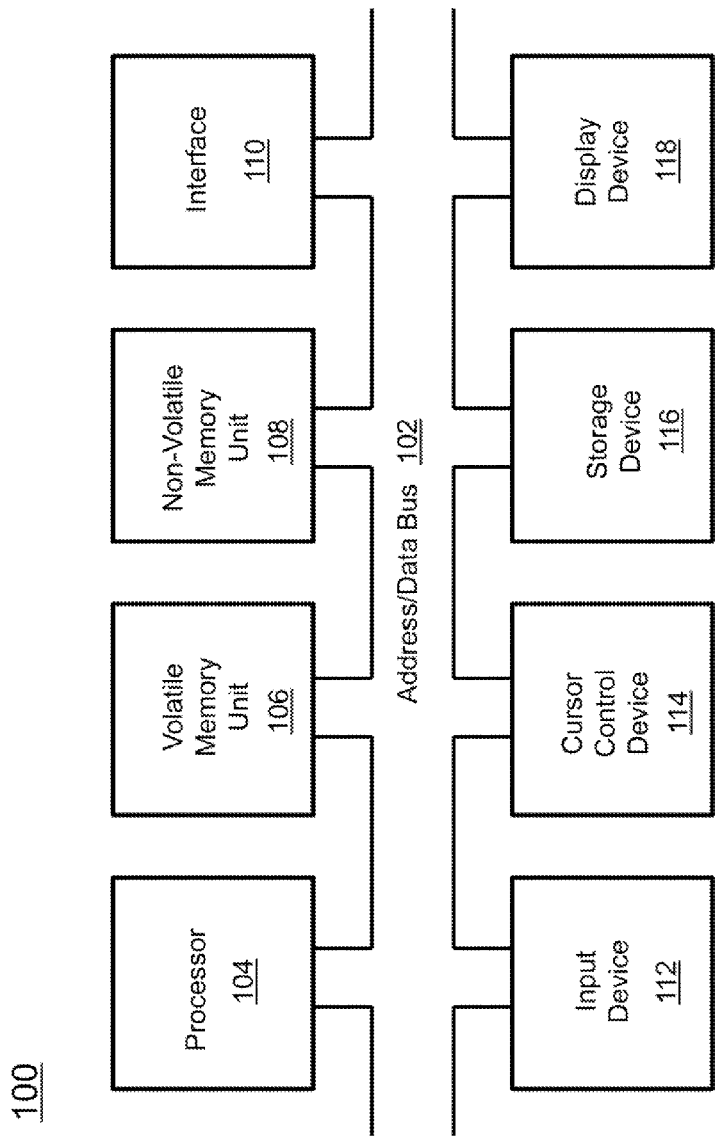
FIG. 1 is a block diagram depicting the components of a system for optimizing visual inspection of radar targets according to the principles of the present invention.

The present invention relates to a system for optimizing visual inspection of radar targets and, more particularly, to a system for optimizing visual inspection of radar targets though automated scheduling of a radar-cued camera system. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Next, a description of various principal aspects of the present invention is provided. Following that is an introduction that provides an overview of the present invention. Finally, specific details of the present invention are provided to give an understanding of the specific aspects.

(1) List of Incorporated Cited Literature References

The following references are cited throughout this application. For clarity and convenience, the references are listed herein as a central resource for the reader. The following references are hereby incorporated by reference as though fully included herein. The references are cited in the application by referring to the corresponding literature reference number, as follows:

1. van den Broek, B.; Burghouts, G.; van den Broek, S.; Smith, A.; Hagen, R.; Anitori, L.; and van Rossum, W., "Automatic Detection of Hostile Behavior", Proc SPIE vol 7480 74800R-1, 2009.
2. Schwering, P. B. W.; Lensen, H. A.; van den Broek, S. P.; den Hollander, R. J. M.; van der Mark, W.; Bouma, H.; and Kemp, R. A. W., "Application of Heterogeneous Multiple Camera System with Panoramic Capabilities in a Harbor Environment", Proc SPIE vol 7481 74810C-1, 2009.
3. Faisal Z. Qureshi and Demetri Terzopoulos, "Surveillance camera scheduling: a virtual vision approach", Multimedia Systems 12:269-283, 2006.
4. Nils Krahnstoever, Ting Yu, Ser-Nam Lim, Kedar Patwardhan, and Peter Tu. "Collaborative Real-Time Control of Active Cameras in Large Scale Surveillance Systems", M2SFA2 2008: Workshop on Multi-camera and Multimodal Sensor Fusion.

(2) Principal Aspects

The present invention has three "principal" aspects. The first is a system for optimizing visual inspection of radar targets. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device, such as the user interface, a camera and/radar (depicted in FIG. 3 as elements 302 and 300, respectively), or any combination of devices that provide the functionalities as described herein. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
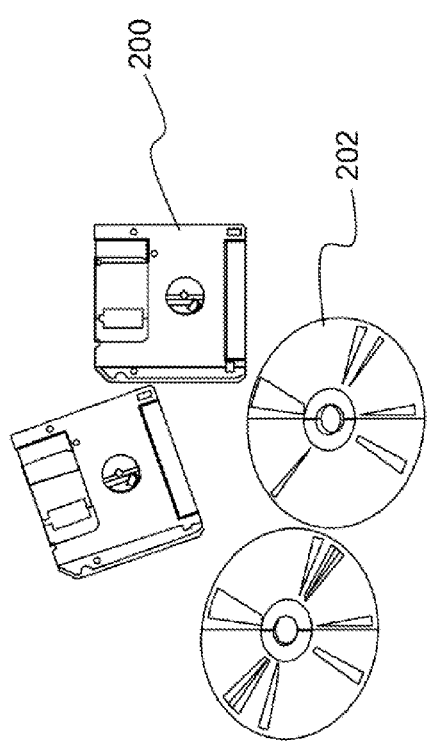
FIG. 2 is an illustration of a computer program product according to the principles of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

A wide field-of-view and rapid response to threats are critical components of any surveillance system. A wide field-of-view is normally implemented by articulating a camera; allowing it to swivel to pan and tilt, and actively zooming in on "interesting" locations. Since a single camera suffers from the "soda straw" problem, where only a small portion of the scene can be examined at any given time, leaving the rest of the scene unwatched, surveillance systems often employ a radar unit to direct the operator to likely targets. This provides direction to the search, but still poses a security risk, since potentially hazardous activities might be occurring in an unwatched portion of the field-of-view while the operator is investigating another incident (either coincidental or intentionally distracting).

There are a number of security systems that combine camera and radar that are designed for ground-level surveillance. The system described below improves dramatically upon current state-of-the-art systems and other similar radar-camera system for target detection. Existing systems typically consist of a radar array that continuously scans an arbitrarily-defined sector and reports any hits (e.g., moving targets) to a human operator, who can then manually pan/tilt/zoom camera(s) (electro-optical, infrared, or both) to the location of the radar hit and visually inspect the area to confirm or reject a hit. While the camera(s) can provide a good video of the current location, they can only examine one location at a time (the size of location covered depends on zoom) and are slow to slew and zoom. This can cause an operator to miss targets in other locations of the scene. The operator can become quickly swamped if a number of radar hits arrive at the same time. The operator can slew and zoom the camera to the locations of the targets as quickly as possible, but at some point, the target will have left the location of the radar hit and will not be acknowledged by the operator. The likelihood of permanently losing a target increases with the width of the field-of-view. The process described above is, therefore, manual and sub-optimal in that many of the radar hits go unexamined.

The invention described herein automates the process of slewing and zooming the camera(s) to a next location that maximizes the visual detection of all radar hits over a given period of time. The system enables the operator to visually inspect as many radar hits as possible over the course of the operator's shift.

(4) Specific Details of the Invention

Figure 3:
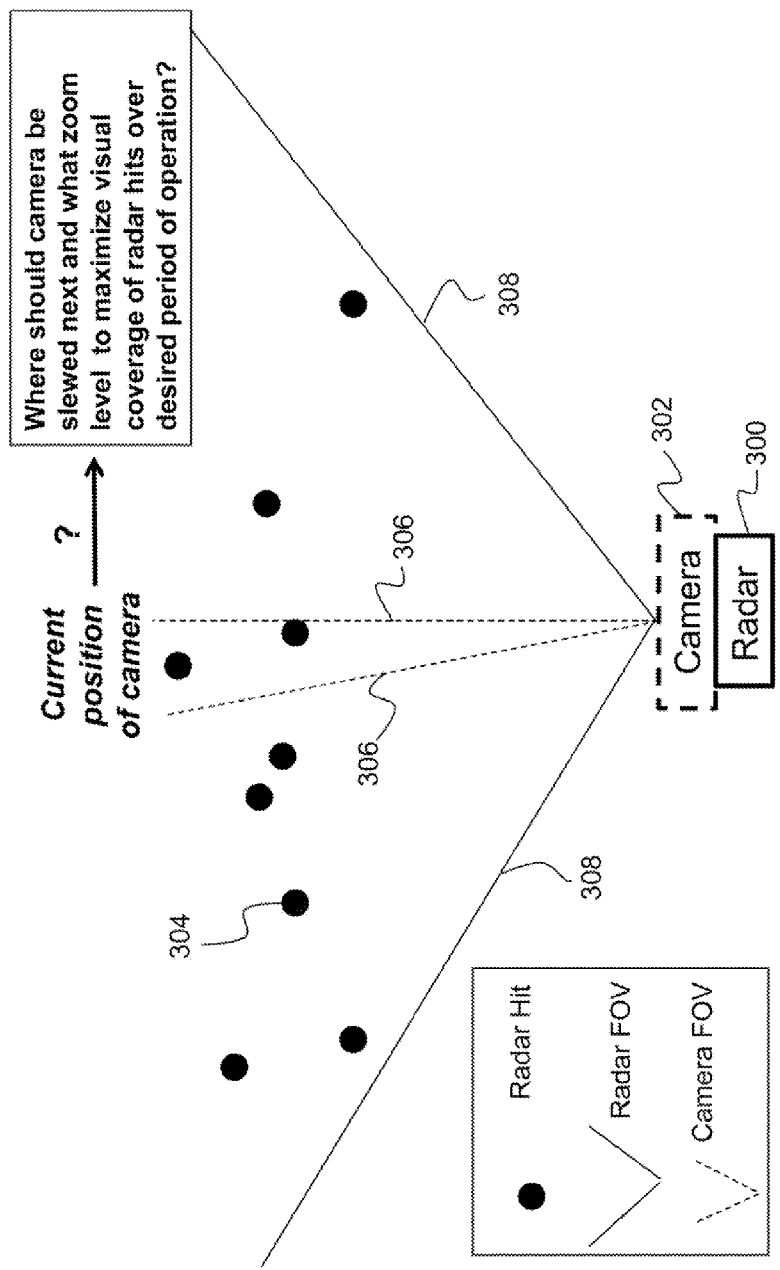
FIG. 3 illustrates a radar-camera system according to the principles of the present invention.

Given the current state (position and zoom) of the sensor and the unexamined radar hit list, the goal is to move the camera to a new state (position and zoom) in order to maximize the value of radar hits. Note that it is not just the number of radar hits examined that matters, but also when they are examined, since newer hits are typically of more value than older hits. This problem is formulated as a scheduling problem, where each radar hit is assigned a value. Since most of the cameras have a discrete step size in zoom (e.g., low, medium, high), the system only needs to address which zoom level to operate at. FIG. 3 depicts the problem of determining where a camera should slew next and what zoom level should be used to maximize visual coverage of radar hits over a desired period of operation. Depicted is a radar 300—camera 302 system, radar hits 304, a sensor (e.g., camera) field-of-view (FOV) 306, and a radar FOV 308. The radar 300 usually mechanically scans the desired radar FOV 308. The camera 302 is a pan-tilt-zoom (PTZ) camera, and the operator must control the camera 302 to visually examine the radar hits 304.

To address the above described problem with the system according to the principles of the present invention, for each radar hit, a single Track Value (TV) metric, for each zoom-level z, is determined that combines multiple metrics as follows:

$$TV(z) = W_T \times TLV + W_S \times SV + W_C \times CV(z)$$

$$\Sigma(W_T + W_S + W_C) = 1,$$

where $W_T$ represents the weighting of the TLV metric, $W_S$ represents the weighting of the SV metric, and $W_C$ represents the weighting of the CV metric, TLV denotes track life value, SV denotes slew value, and CV denotes coverage value.

TLV is a value based on track life (TL), where TL is the time elapsed from when the target was first detected by the radar. SV is a value based on slew angle (S), where S is defined as the angle (in degrees) that a camera needs to move from its current position to a new position that is centered on the radar hit. CV is a coverage value based on coverage (C), where C is the value of any camera position based on how many targets are covered (i.e., visible to it) based on its field-of-view. Each of the individual metrics is described in further detail below. Note that only the CV metric depends on zoom level z. TLV and SV metrics are zoom-independent. Each of the individual metrics and the combined metric is computed for every active radar hit (i.e., target). The camera slews to the hit with the largest TV value and the corresponding zoom level z. Note, this is an extremely fast and efficient scheduler, because one only needs to compute the metrics for the total number of active radar hits (those that have not been visually examined yet). Each of the metrics is also a linear function and, hence, fast to compute.

(4.1) Track Life Value (TLV)

The time elapsed from when the target was first detected by the radar is called Track Life (TL). Targets that are new (i.e., small TL) have a higher Track Life Value (TLV), since they are still expected to be at the location when the camera is slewed to them. Older targets (i.e., high TL) have likely gone into hiding or moved away from the location where the radar first detected them and, therefore, have a lower TLV. Very old targets may still have a non-zero minimum value (MV). In one aspect, TLV is modeled as a linear function with some variations. However, as can be appreciated by one skilled in the art, nonlinear or other functions are just as easy to model and are covered under the present invention. Non-limiting examples of additional models are described below, including a flat-then-linear model and a parabolic model.

Figure 4:
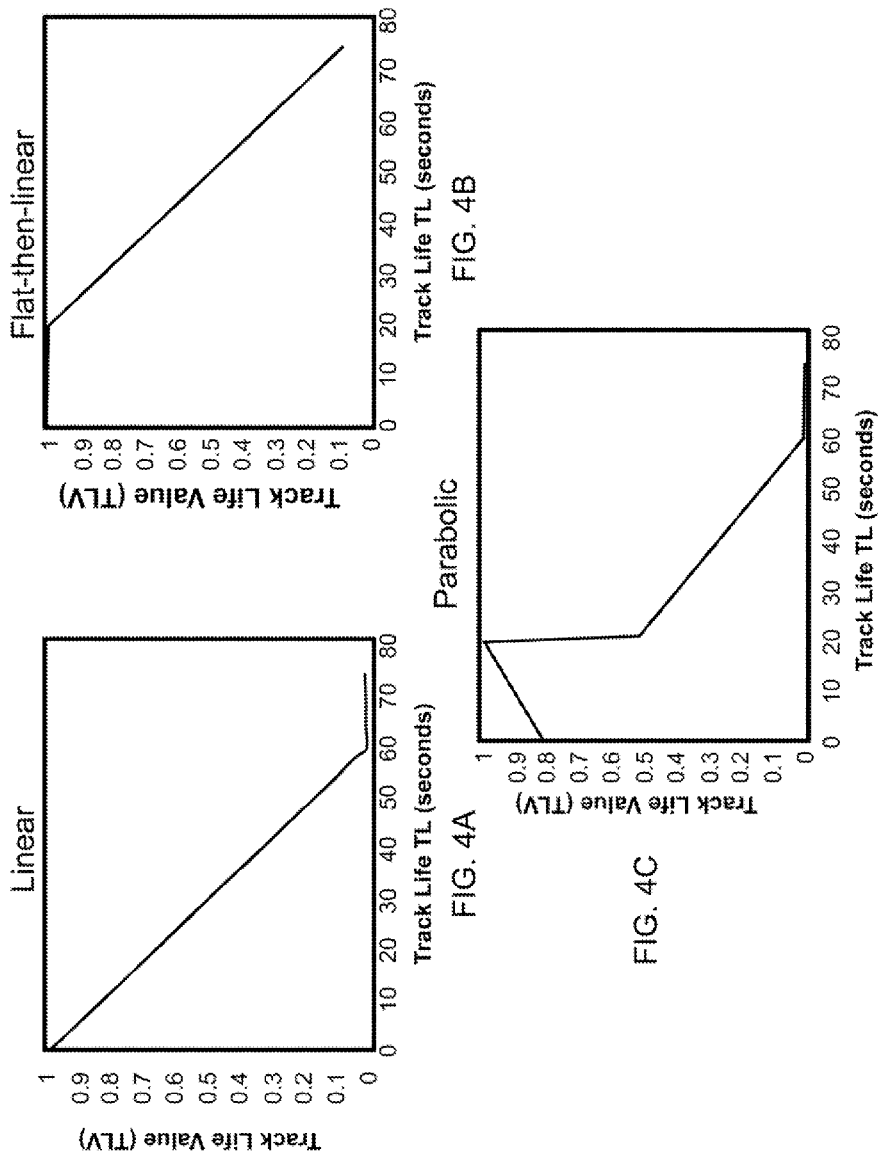
FIG. 4A illustrates a linear track life value (TLV) model according to the principles of the present invention.
FIG. 4B illustrates a flat-then-linear TLV model according to the principles of the present invention.
FIG. 4C illustrates a parabolic TLV model according to the principles of the present invention.

Several TLV models were tested in experimental studies of the present invention, as depicted in FIGS. 4A-4C. These models employ different heuristics to compute track life value (TLV). Depending upon the application at hand, the user can select which model to use. For example, if a TLV drops very quickly for the application as time passes, then a linear model (e.g., FIG. 4A) can be used. For each of the plots depicted in FIGS. 4A-4C, the x-axis represents TLV, and the y-axis represents TL (in seconds). In the linear TLV model, an example of which is illustrated in FIG. 4A, tracks have a maximum value of TLV=1. Tracks have a minimum TLV=MV (non-zero minimum target value). TLV decays linearly between the two extremes with a slope of 1/K. K is an ad hoc number that affects the rate of TLV drop in the linear model. A high slope value means that the TLV drops very quickly. A typical value is K=1 for a slope of 45 degrees.

The linear TLV model is represented by the following equation:

$$TLV = \max\left\{MV, 1 - \frac{TL}{K}\right\},$$

where max represents a maximum value of a set of the elements. The MV of the example plot in FIG. 4A is 0.01, and K=60.

An example of a flat-then-linear TLV model is depicted in FIG. 4B. In this model, tracks have a flat maximum TLV of 1 for a TL up to a certain time (e.g., F=20 seconds in FIG. 4B). F is a time value up to which TLV is a constant as shown in FIG. 4B. In that example F=20. Tracks (i.e., multiple hits corresponding to the same target) have a minimum TLV=MINTARGETVALUE (minimum target value) (e.g., MV=0.01 in FIG. 4B). TLV decays linearly between the two extremes with a slope of 1/K (e.g., K=60 in FIG. 4B). The flat-then-linear TLV model is represented by the following equation:

$$TLV = \max\left\{MV, 1 - \max\left(0, \frac{TL - F}{K}\right)\right\},$$

where F represents a time value up to which TLV is a constant (as shown in FIG. 4B, where F=20).

FIG. 4C illustrates a parabolic TLV model. In this model, an intermediate TL value has the peak value (P). Tracks that are too old or new have lower values and decay linearly. This may be the case where targets that are about to get too old need immediate visual inspection, whereby newer targets still have value left and enough time to slew to visually inspect those later. The parabolic TLV model is represented by the following equations:

$$TLV = 1 - \frac{(P - TL)}{100}, \forall\, TL \leq P,$$

$$TLV = \max\left\{MV, \left(1 - \frac{P}{100}\right) * \left(1 - \frac{TL}{K}\right)\right\}, \forall\, TL > P,$$

where P represents the peak value, and $\forall$ denotes "for all."

(4.2) Slew Value (SV)

Figure 5:
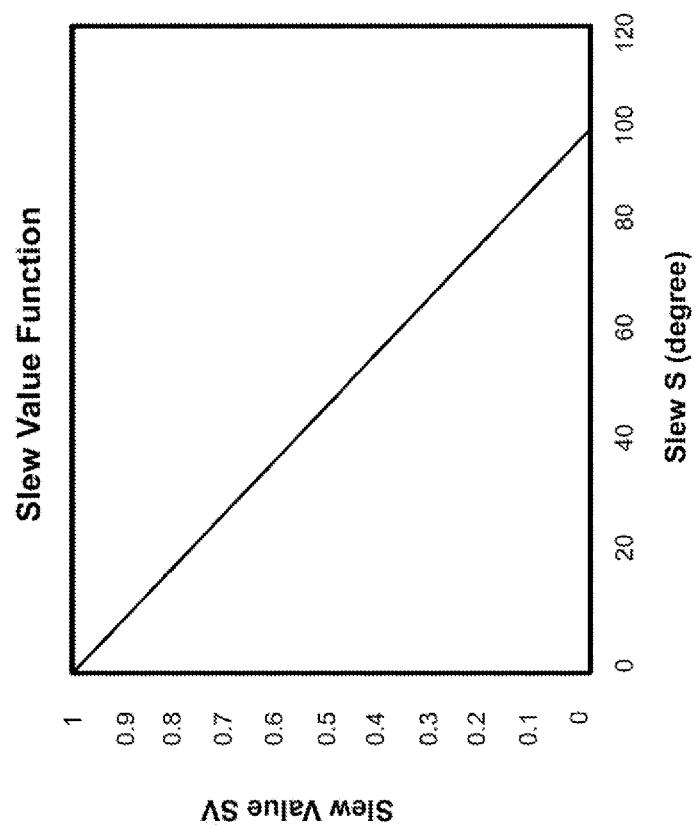
FIG. 5 illustrates a slew value function according to the principles of the present invention.

Let S be the slew angle needed (in degrees) from a current slew position of a camera to a radar hit. Peak slew value is SV=1 when the camera has to slew a maximum slew angle of M. Typically, M is chosen to be the field-of-view of the camera. This ensures that SV is always between 0 and 1, as shown in FIG. 5. The slew value (SV) is determined according to the following:

$$SV = \max\left\{0, 1 - \frac{S}{M}\right\}$$

(4.3) Coverage Value (CV)

When the camera slews to a new position, more than one target (i.e., radar hit) may fall within the field-of-view (FOV). This is more beneficial than if only one target was in the FOV. Providing the operator video on multiple targets within the same imagery is preferred and increases opportunity to detect and observe many targets at once. Coverage Value (CV) is proportional to the number of targets that fall within the camera's FOV at any slew position. Let CM be the maximum number of targets expected within the FOV, N be the actual number of targets in FOV at a slew position, and z be the zoom level (typically low, medium, and high). Note that CV depends on the zoom value z. Since most cameras operate at discrete zoom levels, the CV is computed at each zoom level. CV(z) is determined according to the following:

$$CV(z) = \max\left\{0, 1 - \frac{N}{CM}\right\}.$$

Figure 6:
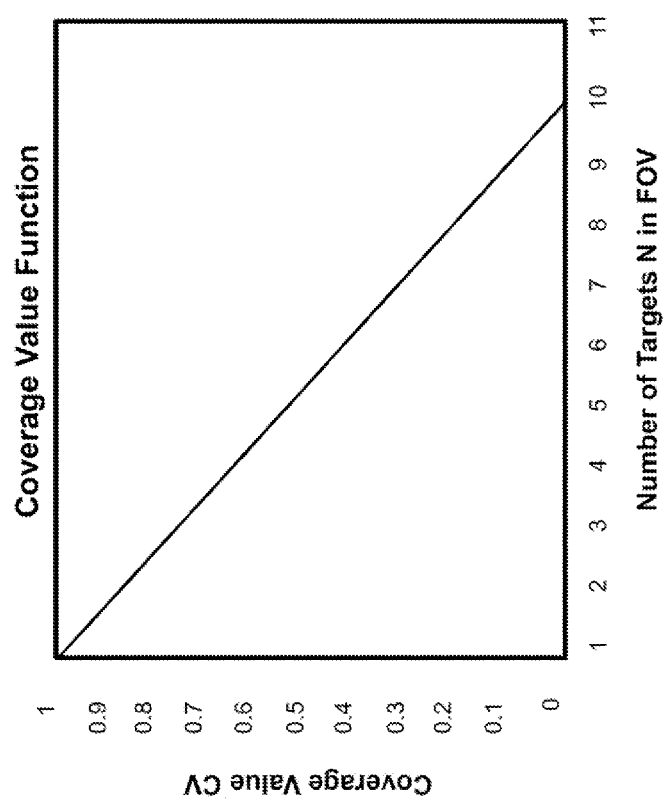
FIG. 6 illustrates a coverage value function according to the principles of the present invention.

FIG. 6 depicts an example of the coverage value function with a CM=10 targets.

Figure 7:
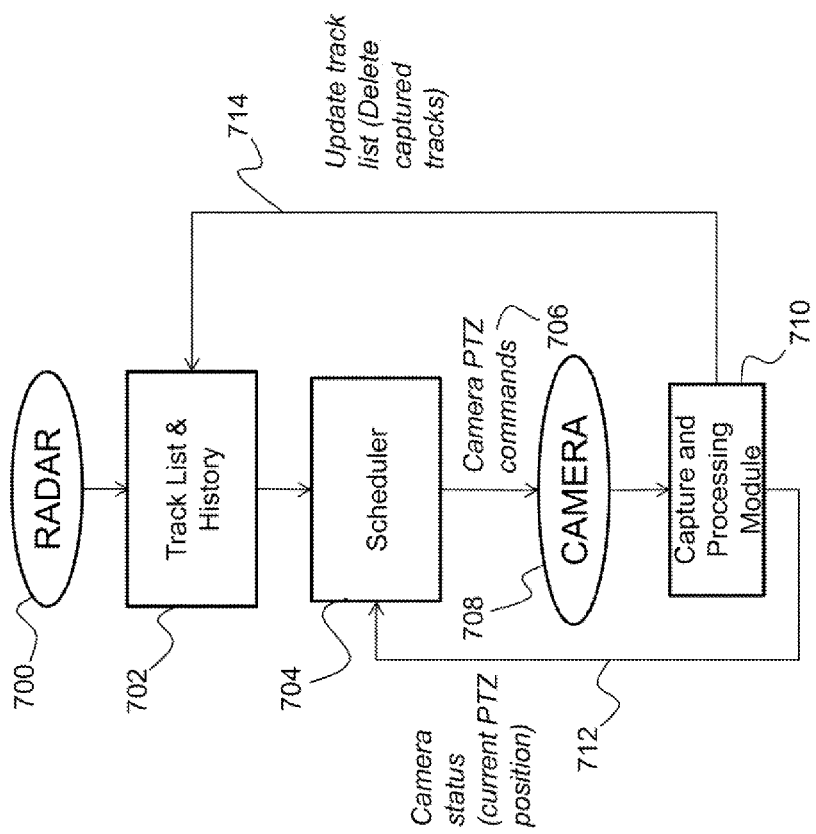
FIG. 7 is a flow diagram of a system for optimizing visual inspection of radar targets according to the principles of the present invention.

FIG. 7 is a flow diagram depicting automated scheduling of a radar-cued camera system for optimizing visual detection of radar targets according to the principles of the present invention. Radar hits are obtained from a radar system 700 and stored in a track (i.e., radar hit) list and history module 702. A scheduler module 704 determines, for each radar hit (track) a single TV metric that combines the TLV, SV, and CV metrics for each zoom level. The scheduler module 704 then sends a set of camera PTZ commands 706, based on the TV metrics, to a camera system 708, such that the camera system 708 slews from a current state (position and zoom) to the radar hit with the largest TV value and the corresponding zoom level (i.e., a new state). A capture and processing module 710 then captures and processes an image given the new state to generate captured tracks. The camera status (current PTZ position) 712 is then sent to the scheduler module to update the current state of the camera system 708. Additionally, the capture and processing module 710 updates the track list 714 by sending information related to the captured tracks to the track list and history module 702 to delete the captured tracks from the stored track list.

A non-limiting example of a radar in the radar system 700 includes the manportable surveillance and target acquisition radar (MSTAR V6) produced by DRS Technologies located at 201 Evans Lane, St. Louis, Mo., 63121. The camera(s) of the radar system 700 may include any off-the-shelf high resolution camera. A non-limiting example of a camera(s) in the radar system 700 includes the Imperx ICL-B6620C-KFO 6600×4400 Kodak KAI-29050 43.3 millimeter F-Mount Color Camera Link 29MP camera. Typically, a radar has wired ethernet compatible outputs (e.g., Cat 5) and connects to a processor/computer with compatible software to access its outputs and control it. Likewise, a camera is typically connected to one or more processors via wired interfaces (e.g., CameraLink, Ethernet). However, the present invention is connection-agnostic; as long as data comes to the processor(s) via any method, it can be processed according to the principles of the present invention.

(4.4) Experimental Studies

Below is a set of parameters used in experimental studies.
Field Test Parameters:
FOV=100; % Total scan sector FOV (degrees)
DURATION=50; % Total duration of test to run scheduler (sec)
NUMTARGETS=20; % Total number of targets during this period
Camera zoom levels (low, med, high) corresponded to FOVs of 15, 6 and 1.5 degrees, respectively.
Scheduler Parameters:
K=60; % Slope of drop in TLV
MV=0.01; % Minimum track life value
P=20; % For Flat-then-linear TLV function
C=20; % For parabolic TLV function
M=FOV; % If need to slew beyond this, no value.

Figure 8B:
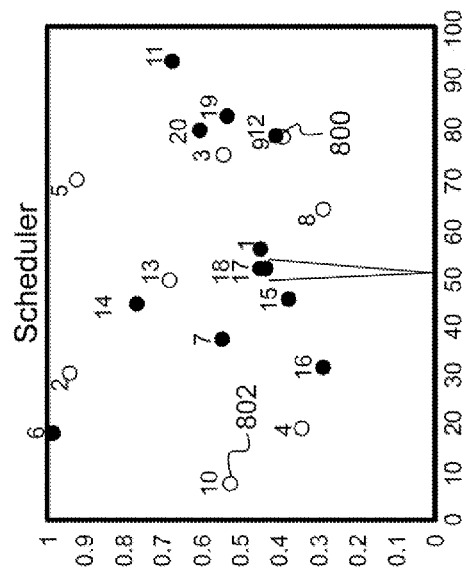
FIG. 8B is an example result of testing a radar-camera system with optimization according to the principles of the present invention.
Figure 8A:
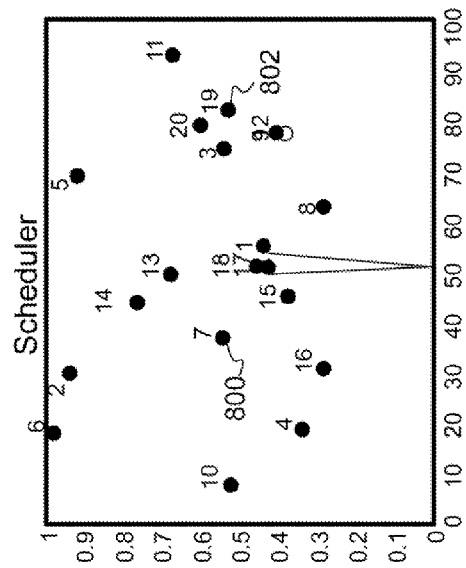
FIG. 8A is an example result of testing a radar-camera baseline system.

Experimental studies were performed to test the system according to the principles of the present invention via a replay of live realistic target scenarios and a radar-camera system as part of live testing. FIGS. 8A and 8B depict results from a 50-second portion of the test that contained 20 radar hits with the baseline system (depicted in FIG. 8A) and with the system according to the principles of the present invention (depicted in FIG. 8B). Filled circles 800 represent hits that have been examined. Unfilled circles 802 represent hits that have not been examined. Some of the hits have expired (as too old) and, therefore, the number of hits shown in FIGS. 8A and 8B is 20.

Note that the baseline manual operation (FIG. 8A) was only able to schedule (i.e., examine) approximately 60% of the targets (12 out of 20). Additionally, the average time delay per target and slew needed are high. Specifically, the average time delay per target scheduled was 16.9 seconds, and the average slew angle motion per target was 33.5 degrees. The average time delay per target and slew needed are calculated numbers that the system outputs after the scheduler has been run. Large values of both of these variables imply a sub-optimal scheduler.

The scheduler in FIG. 8B, which represents the system according to the principles of the present invention, was able to schedule 95% of the targets (19 out of 20). Only target 2 could not be scheduled. The average time delay per target schedule was 7.33 seconds, and the average slew angle motion per target was 12.3 degrees. The scheduler ran in real-time and did not cause any slowdown of the overall system operation.

What is claimed is:

1. A system for optimizing visual inspection of radar targets, the system comprising:
   one or more processors and a non-transitory computer-readable medium having executable instructions encoded thereon such that when executed, the one or more processors perform operations of:
   detecting a plurality of radar hits with a radar system, wherein the radar system comprises a radar and a radar-cued camera having a current state comprising a current slew position and a current zoom level;
   storing the plurality of radar hits as a stored track list;
   determining a plurality of metrics for each radar hit, wherein the plurality of metrics comprises a track life value (TLV) metric, a slew value (SV) metric, and a coverage value (CV) metric;
   determining, for each radar hit, a track value (TV) metric that combines the plurality of metrics for each zoom level of the radar-cued camera;
   sending the radar-cued camera a set of pan-tilt-zoom commands based on the TV metric, such that the radar-cued camera slews from the current state to a new state, wherein the new state is a position of a radar hit with the largest TV metric and a corresponding zoom level;
   capturing and processing an image given the new state to generate a set of captured tracks; and
   updating the current state of the radar-cued camera to reflect the new state.

2. The system as set forth in claim 1, wherein the one or more processors further performs an operation of updating the stored track list to delete radar hits corresponding to the captured tracks from the stored track list.

3. The system as set forth in claim 2, wherein the TLV metric for each radar hit corresponds to time that has elapsed since the radar hit was first detected, such that a newer radar hit has a higher TLV metric and an older radar hit has a lower TLV metric.

4. The system as set forth in claim 3, wherein the one or more processors further performs an operation of determining the SV metric for each radar hit according to the following:

$$SV = \max\left\{0, 1 - \frac{S}{M}\right\},$$

where S denotes a slew angle needed from a current position of the radar-cued camera to a position of the radar hit, max denotes a maximization function, and M denotes a predetermined maximum slew angle.

5. The system as set forth in claim 4, wherein the CV metric is proportional to a number of radar hits that fall within a field-of-view of the radar-cued camera, and wherein the one or more processors further performs an operation of determining the CV metric according to the following:

$$CV(z) = \max\left\{0, 1 - \frac{N}{CM}\right\},$$

where CM denotes a maximum number of radar hits expected within the field-of-view of the radar-cued camera, z denotes the zoom level, max denotes a maximization function, and N denotes an actual number of radar hits within the field-of-view of the radar-cued camera at a given slew position and zoom level z.

6. The system as set forth in claim 5, wherein the one or more processors further performs an operation of determining the TV metric according to the following:

$$TV(z) = W_T \times TLV + W_S \times SV + W_C \times CV(z),$$

such that $\Sigma(W_T + W_S + W_C) = 1$,
where $W_T$ denotes weighting of the TLV metric, $W_S$ denotes weighting of the SV metric, $W_C$ denotes weighting of the CV metric, and $\Sigma$ denotes a summation.

7. A computer-implemented method for optimizing visual inspection of radar targets, comprising an act of:
causing a data processor to execute instructions stored on a non-transitory memory such that upon execution, the data processor performs operations of:
detecting a plurality of radar hits with a radar system, wherein the radar system comprises a radar and a radar-cued camera having a current state comprising a current slew position and a current zoom level;
storing the plurality of radar hits as a stored track list;
determining a plurality of metrics for each radar hit, wherein the plurality of metrics comprises a track life value (TLV) metric, a slew value (SV) metric, and a coverage value (CV) metric;
determining, for each radar hit, a track value (TV) metric that combines the plurality of metrics for each zoom level of the radar-cued camera;
sending the radar-cued camera a set of pan-tilt-zoom commands based on the TV metric, such that the radar-cued camera slews from the current state to a new state, wherein the new state is a position of a radar hit with the largest TV metric and a corresponding zoom level;
capturing and processing an image given the new state to generate a set of captured tracks; and
updating the current state of the radar-cued camera to reflect the new state.

8. The method as set forth in claim 7, wherein the one or more processors further perform an operation of updating the stored track list to delete radar hits corresponding to the captured tracks from the stored track list.

9. The method as set forth in claim 8, wherein the TLV metric for each radar hit corresponds to time that has elapsed since the radar hit was first detected, such that a newer radar hit has a higher TLV metric and an older radar hit has a lower TLV metric.

10. The method as set forth in claim 9, wherein the one or more processors further performs an operation of determining the SV metric for each radar hit according to the following:

$$SV = \max\left\{0, 1 - \frac{S}{M}\right\},$$

where S denotes a slew angle needed from a current position of the radar-cued camera to a position of the radar hit, max denotes a maximization function, and M denotes a predetermined maximum slew angle.

11. The method as set forth in claim 10, wherein the CV metric is proportional to a number of radar hits that fall within a field-of-view of the radar-cued camera, and wherein the one or more processors further performs an operation of determining the CV metric according to the following:

$$CV(z) = \max\left\{0, 1 - \frac{N}{CM}\right\},$$

where CM denotes a maximum number of radar hits expected within the field-of-view of the radar-cued camera, z denotes the zoom level, max denotes a maximization function, and N denotes an actual number of radar hits within the field-of-view of the radar-cued camera at a given slew position and zoom level z.

12. The method as set forth in claim 11, wherein the one or more processors further performs an operation of determining the TV metric according to the following:

$$TV(z) = W_T \times TLV + W_S \times SV + W_C \times CV(z),$$

such that $\Sigma(W_T + W_S + W_C) = 1$,
where $W_T$ denotes weighting of the TLV metric, $W_S$ denotes weighting of the SV metric, $W_C$ denotes weighting of the CV metric, and $\Sigma$ denotes a summation.

13. A computer program product for optimizing visual inspection of radar targets, the computer program product comprising computer-readable instructions stored on a non-transitory computer-readable medium that are executable by a computer having a processor for causing the processor to perform operations of:
detecting a plurality of radar hits with a radar system, wherein the radar system comprises a radar and a radar-cued camera having a current state comprising a current slew position and a current zoom level;
storing the plurality of radar hits as a stored track list;
determining a plurality of metrics for each radar hit, wherein the plurality of metrics comprises a track life value (TLV) metric, a slew value (SV) metric, and a coverage value (CV) metric;
determining, for each radar hit, a track value (TV) metric that combines the plurality of metrics for each zoom level of the radar-cued camera;
sending the radar-cued camera a set of pan-tilt-zoom commands based on the TV metric, such that the radar-cued camera slews from the current state to a new state, wherein the new state is a position of a radar hit with the largest TV metric and a corresponding zoom level;
capturing and processing an image given the new state to generate a set of captured tracks; and
updating the current state of the radar-cued camera to reflect the new state.

14. The computer program product as set forth in claim 13, further comprising instructions for causing the processor to perform an operation of updating the stored track list to delete radar hits corresponding to the captured tracks from the stored track list.

15. The computer program product as set forth in claim 14, wherein the TLV metric for each radar hit corresponds to time that has elapsed since the radar hit was first detected, such that a newer radar hit has a higher TLV metric and an older radar hit has a lower TLV metric.

16. The computer program product as set forth in claim 15, further comprising instructions for causing the processor to perform an operation of determining the SV metric for each radar hit according to the following:

$$SV = \max\left\{0, 1 - \frac{S}{M}\right\},$$

where S denotes a slew angle needed from a current position of the radar-cued camera to a position of the radar hit, max denotes a maximization function, and M denotes a predetermined maximum slew angle.

17. The computer program product as set forth in claim 16, wherein the CV metric is proportional to a number of radar hits that fall within a field-of-view of the radar-cued camera, and wherein the computer program product further comprises instructions for causing the processor to perform an operation of determining the CV metric according to the following:

$$CV(z) = \max\left\{0, 1 - \frac{N}{CM}\right\},$$

where CM denotes a maximum number of radar hits expected within the field-of-view of the radar-cued camera, z denotes the zoom level, max denotes a maximization function, and N denotes an actual number of radar hits within the field-of-view of the radar-cued camera at a given slew position and zoom level z.

18. The computer program product as set forth in claim 17, further comprising instructions for causing the processor to perform an operation of determining the TV metric according to the following:

$$TV(z) = W_T \times TLV + W_S \times SV + W_C \times CV(z),$$

such that $\Sigma(W_T + W_S + W_C) = 1$, where $W_T$ denotes weighting of the TLV metric, $W_S$ denotes weighting of the SV metric, $W_C$ denotes weighting of the CV metric, and $\Sigma$ denotes a summation.

19. A system for optimizing visual inspection of radar targets, the system comprising:
a radar system, the radar system including a radar and a radar-cued camera having a current state comprising a current slew position and a current zoom level;
one or more processors operably connected with the radar system and a non-transitory computer-readable medium having executable instructions encoded thereon such that when executed, the one or more processors perform operations of:
  detecting a plurality of radar hits with the radar system;
  storing the plurality of radar hits as a stored track list;
  determining a plurality of metrics for each radar hit, wherein the plurality of metrics comprises a track life value (TLV) metric, a slew value (SV) metric, and a coverage value (CV) metric;
  determining, for each radar hit, a track value (TV) metric that combines the plurality of metrics for each zoom level of the radar-cued camera;
  sending the radar-cued camera a set of pan-tilt-zoom commands based on the TV metric, such that the radar-cued camera slews from the current state to a new state, wherein the new state is a position of a radar hit with the largest TV metric and a corresponding zoom level;
  capturing and processing an image given the new state to generate a set of captured tracks; and
  updating the current state of the radar-cued camera to reflect the new state.

\* \* \* \* \*